UNITED STATES PATENT OFFICE.

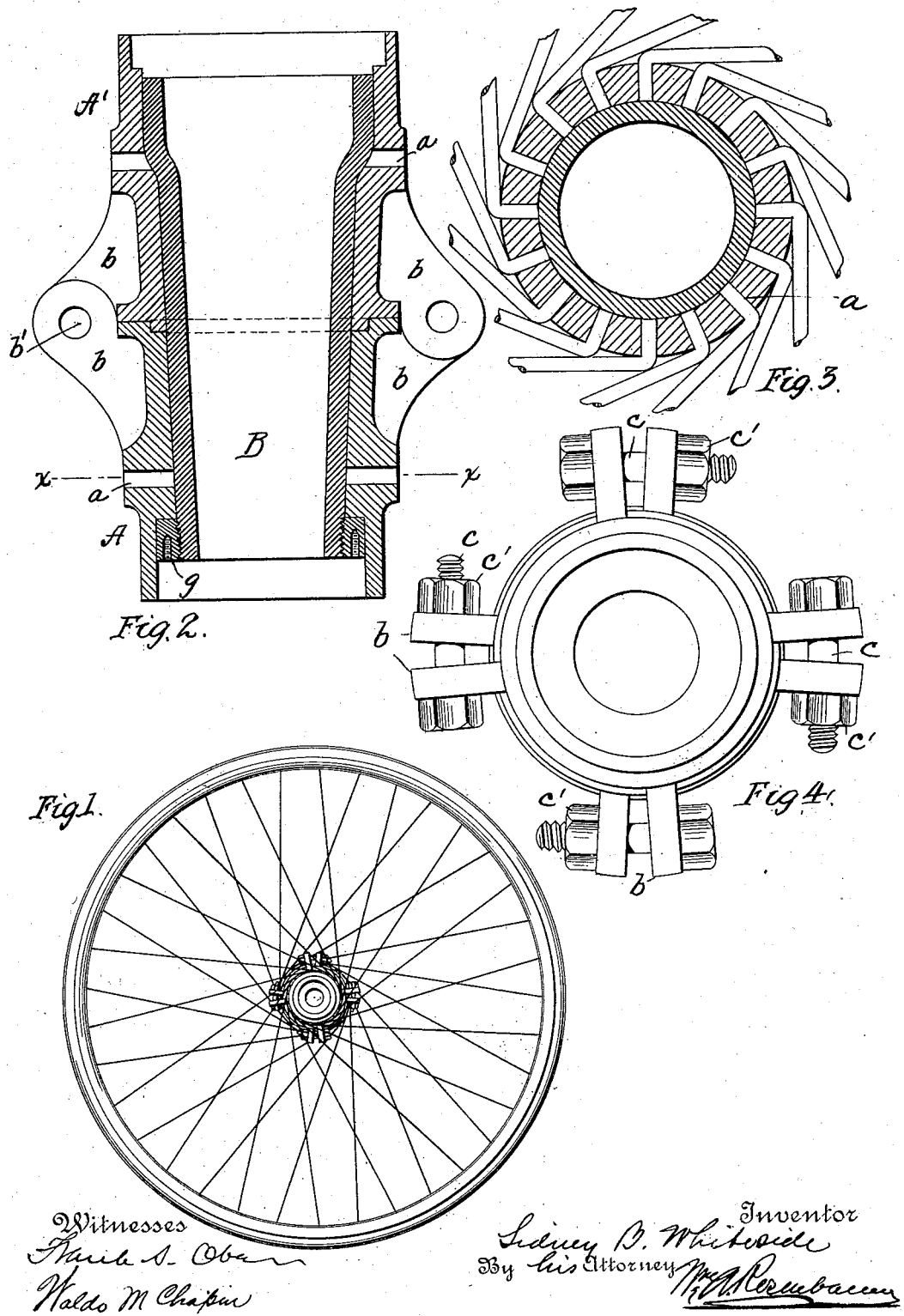

SIDNEY B. WHITESIDE, OF NEW YORK, N. Y., ASSIGNOR TO WHITESIDE WHEEL COMPANY, LIMITED, OF GRAND RAPIDS, MICHIGAN.

VEHICLE-WHEEL.

SPECIFICATION forming part of Letters Patent No. 712,876, dated November 4, 1902.

Application filed March 11, 1902. Serial No. 97,787. (No model.)

*To all whom it may concern:*

Be it known that I, SIDNEY B. WHITESIDE, a citizen of the United States, residing at the city of New York, in the borough of Manhattan and State of New York, have invented certain new and useful Improvements in Vehicle-Wheels, of which the following is a full, clear, and exact description.

This invention relates to vehicle-wheels, and has special reference to the type of wheel described in my previous application, Serial No. 93,178, filed February 8, 1902. This wheel consists of a rim and a hub, the latter in two parts movable in a circumferential direction with respect to each other, and two sets of spokes extending from the rim to the respective parts of the hub, whereby uniform tension may be put upon all the spokes and the entire wheel by rotating the two parts of the hub in opposite directions and then locking them together at the point where the desired tension is obtained. In the present case the invention has to do with the means for locking the two parts of the hub under tension. It also relates to certain other details of construction, all of which will be fully described hereinafter, and pointed out in the claims.

In the accompanying drawings, Figure 1 is a side elevation of the wheel. Fig. 2 is a section through the hub of the wheel. Fig. 3 is a section on line $xx$ of Fig. 2. Fig. 4 is an end elevation of the hub.

The hub of the wheel is divided into two parts on a plane substantially at right angles to the axis, said parts being indicated by A and A' and the line of division being substantially at the middle point of the hub, although this is not essential. Each part of the hub is provided with substantial radial holes $a$ to receive the ends of the spokes, as shown in Fig. 3, the spokes being provided with hooks for this purpose and leading from the surface of the hub in an approximately tangential direction to the rim. The spokes connected with one part of the hub lead to the rim in a direction opposite to those connected with the other part of the hub, so that when the two parts of the hub are rotated with respect to each other by means of a suitable wrench or other device a uniform tension is put upon all the spokes simultaneously.

The primary feature of the present invention is the means whereby the two parts of the hub are locked under tension, and this will now be described. The abutting ends of the two parts of the hub are each provided with one or more ears or lugs $b$, which project radially outward and extend across the joint, so that the lugs on one part of the hub will overlap those on the other, and thus provide for the location of a hole $b'$, which shall be in line with a similar hole in the next adjacent lug and adapt the lugs to be connected together in pairs by bolts $c$ and nuts $c'$. When the relative rotation of the parts of the hub occurs, the adjacent lugs approach each other, and when the tension or torsional strain has been brought to the proper degree the bolts $c$ are inserted through the several pairs of lugs, and the nuts $c'$ are applied to the bolts and set up until the lugs are confined between the head of the bolts and the nuts, thus securing the parts of the hub and the wheel under strain.

It is obvious that the number of pairs of lugs is not material as affecting the scope of my invention, since in some wheels a single pair of lugs will be sufficient, while in heavy wheels intended to do heavy work two or more pairs of lugs are desirable. My invention also extends to other means for holding the pairs of lugs together—for instance, a U-shaped clamp could be dropped over each pair of lugs.

Any suitable form of box, as B, may be used with this hub and held in place by the nut $g$ or in any other desired way.

I claim—

1. A wheel consisting of the combination of a rim, and a hub in two parts separated on a plane substantially at right angles to the axis, two sets of spokes leading from the rim to the respective parts of the hub, lugs projecting radially from the parts of the hub said parts being adapted to be rotated with respect to each other after the spokes have been connected therewith, and means for locking or securing the lugs together to hold the parts under tension, substantially as described.

2. In a wheel, the combination of a rim, and a hub in two parts separated on a plane substantially at right angles to the axis, two sets of spokes extending from the rim to the respective parts of the hub said parts being adapted to be rotated with respect to each other after the spokes have been connected therewith, lugs projecting from each part of the hub, and bolts securing the lugs on one part to those on the other, substantially as described.

3. In a wheel, the combination of the rim, and a hub in two parts separated on a plane substantially at right angles to the axis, two sets of spokes extending from the rim to the respective parts of the hub, said parts being adapted to be rotated with respect to each other after the spokes have been connected therewith, lugs projecting radially from each part of the hub, those of one part overlapping those of the other, and means for securing the overlapping lugs together, substantially as described.

4. In a wheel, the combination of a rim, and a hub in two parts separated on a plane substantially at right angles to the axis, two sets of spokes extending from the rim to the respective parts of the hub, said parts being adapted to be rotated with respect to each other after the spokes have been connected therewith, lugs projecting radially from each part of the hub, the lugs of one part overlapping those of the other, each lug being perforated and bolts passing through said perforations and connecting the lugs together in pairs, each pair consisting of a lug from each part of the hub, substantially as described.

In witness whereof I subscribe my signature in presence of two witnesses.

SIDNEY B. WHITESIDE.

Witnesses:
WM. A. ROSENBAUM,
FRANK S. OBER.